United States Patent
Minaz et al.

(10) Patent No.: US 10,690,078 B2
(45) Date of Patent: Jun. 23, 2020

(54) SYSTEM AND METHOD FOR ESTIMATING ENGINE EXHAUST NITROGEN OXIDE SENSOR INSTABILITY

(71) Applicant: International Engine Intellectual Property Company, LLC, Lisle, IL (US)

(72) Inventors: Askin Minaz, Aurora, IL (US); Robert Manoni, Streamwood, IL (US)

(73) Assignee: International Engine Intellectual Property Company, LLC, Lisle, IL (US)

(*) Notice: Subject to any disclaimer, the term of this patent is extended or adjusted under 35 U.S.C. 154(b) by 34 days.

(21) Appl. No.: 15/962,650

(22) Filed: Apr. 25, 2018

(65) Prior Publication Data

US 2019/0331044 A1 Oct. 31, 2019

(51) Int. Cl.
  *F02D 41/14* (2006.01)
  *F01N 3/20* (2006.01)

(52) U.S. Cl.
  CPC ......... *F02D 41/1462* (2013.01); *F01N 3/206* (2013.01); *F01N 3/208* (2013.01); *F01N 2550/05* (2013.01); *F01N 2560/026* (2013.01); *F01N 2900/0416* (2013.01); *F01N 2900/08* (2013.01)

(58) Field of Classification Search
  CPC combination set(s) only.
  See application file for complete search history.

(56) References Cited

U.S. PATENT DOCUMENTS

| | | | |
|---|---|---|---|
| 9,145,842 B2* | 9/2015 | Takahashi | F01N 3/208 |
| 10,100,698 B2* | 10/2018 | Minezawa | F01N 3/08 |
| 10,267,778 B2* | 4/2019 | Gong | G01N 33/0037 |
| 2010/0031633 A1* | 2/2010 | Kitazawa | F01N 3/0807 60/276 |
| 2011/0202230 A1* | 8/2011 | Sawada | B01D 53/9409 701/29.2 |
| 2012/0255277 A1* | 10/2012 | Rajagopalan | F02D 41/123 60/274 |
| 2017/0241321 A1* | 8/2017 | Yoo | F01N 11/00 |

* cited by examiner

*Primary Examiner* — Binh Q Tran
(74) *Attorney, Agent, or Firm* — Jack D. Nimz; Jeffrey P. Calfa; Mark C. Bach

(57) ABSTRACT

A system and method is provided for estimating engine exhaust nitrogen oxide sensor signal instability in transient conditions, for example when rapid changes occur in driver demanded torque, and for eliminating fluctuations in EONOx sensor signal status, in order to have more robust on-board diagnostics monitoring and exhaust nitrogen oxide control. The system and method predicts EONOx sensor signal instability by comparing a calculated pedal based driver demand torque delta to calculated instability thresholds and instability threshold hysteresis margins, and generates instability flags. The system and method further validates any predicted EONOx sensor signal instability by observation. Upon validation of the predicted EONOx sensor signal instability, the system and method latches the EONOx sensor signal status to a stable value.

17 Claims, 4 Drawing Sheets

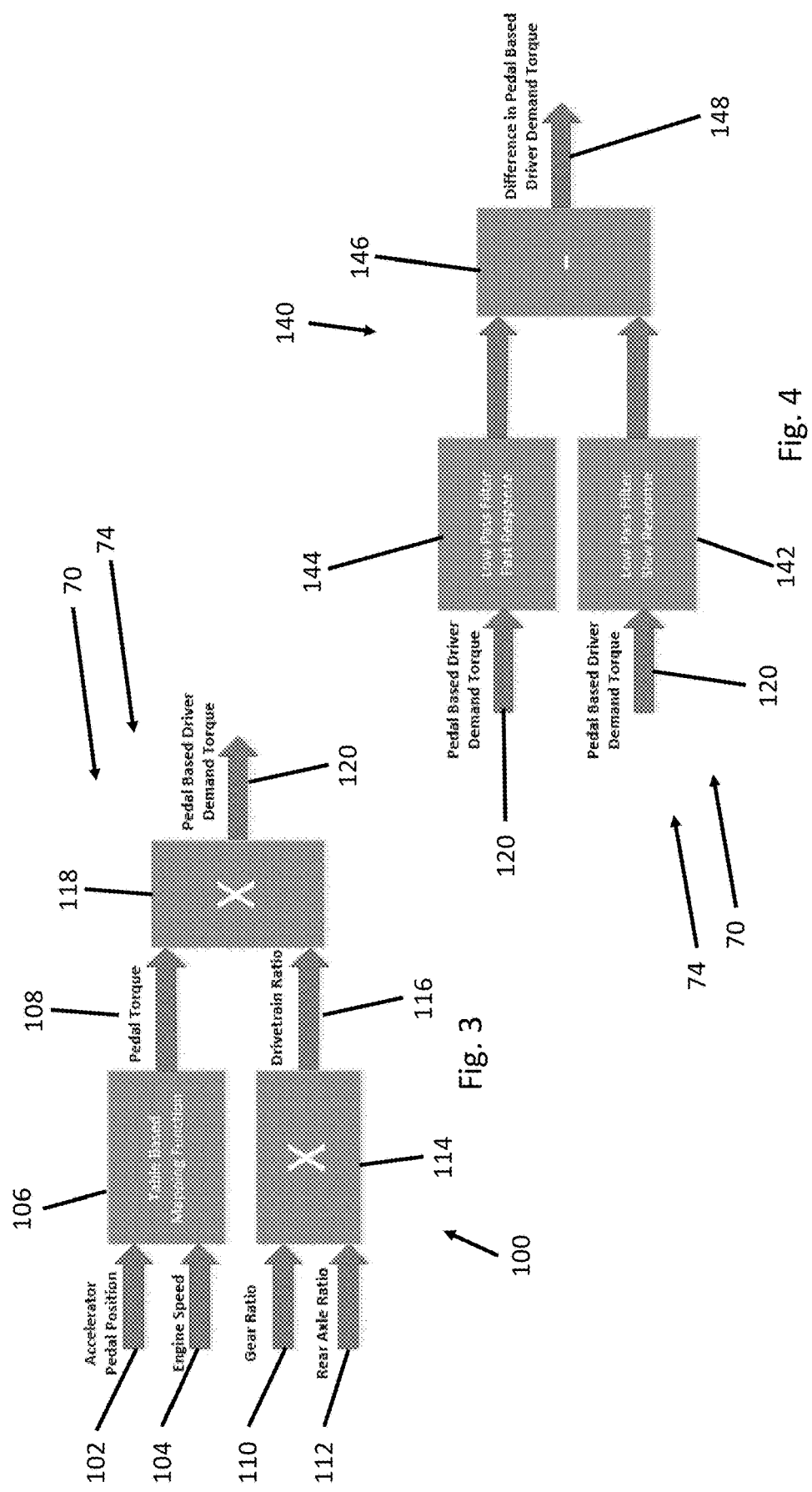

SYSTEM AND METHOD FOR ESTIMATING ENGINE EXHAUST NITROGEN OXIDE SENSOR INSTABILITY

BACKGROUND

Embodiments described herein generally relate to arrangements and methods for estimating engine exhaust nitrogen oxide sensor signal instability in transient conditions, particularly when rapid changes occur in driver demanded torque, and for eliminating fluctuations in engine-out nitrogen oxide sensor signal status, in order to have more robust on-board diagnostics monitoring and exhaust nitrogen oxide control.

RELATED ART

Diesel engines commonly operate with a lean air to fuel ratio, so that only part of the available oxygen is used in the fuel combustion reaction. While this helps to make diesel engines efficient, it also results in the formation of nitrogen oxides (NOx), an undesirable pollutant, during the combustion process. Presently, the Environmental Protection Agency (EPA) regulates the amount of NOx that may be emitted in vehicle exhaust, so that vehicle and engine manufacturers employ various techniques to reduce NOx emissions.

A common technique to reduce NOx tailpipe emissions involves the use of Selective Catalytic Reduction (SCR). SCR works by injecting a solution of urea, a reductant that is sometimes referred to as Diesel Exhaust Fluid (DEF), into the flow of vehicle engine exhaust. Such DEF is commonly sold under the trademark AdBlue, or as ISO 22241 AUS325. The urea solution then evaporates and thermally decomposes due to the heat of the exhaust. Ammonia liberated from the urea then reacts with the NOx in the presence of a catalyst to form diatomic nitrogen ($N_2$), water ($H_2O$), and carbon dioxide ($CO_2$). The catalyst is provided in the form of a structure, often a honeycomb shape or similar arrangement, with a coating such as a metal oxide or metal exchanged zeolites, located downstream in the exhaust flow from the location of urea injection. The SCR urea injector and catalytic device, together with a filter for removing particulates from the exhaust flow, generally located upstream in the exhaust flow from the SCR urea injector and catalytic device, are often collectively referred to as exhaust after-treatment.

Another technique to reduce NOx tailpipe emissions involves the use of Exhaust Gas Recirculation (EGR). EGR recirculates a percentage of exhaust gases back into the intake of the engine, in order to lower the amount of free oxygen in the intake air and to reduce the peak in-cylinder combustion temperatures. This, in turn, reduces the amount of NOx formation that takes place within the cylinders, while also reducing overall engine efficiency. Most modern diesel engines utilize both EGR and SCR, sometimes in combination with some form of combustion optimization. In order to control such factors as boost pressure, fuel injection timing and profile, EGR valve setting, and SCR injection, it is necessary to detect NOx emissions within the flow of exhaust, and to adjust the controls accordingly. Therefore, Engine Out Nitrogen Oxide (EONOx) sensors are often provided in order to detect the NOx emissions within the flow of exhaust and to provide this information by way of J1939 data bus to a controller such as an Engine Control Module (ECM).

EONOx sensors, which may be smart sensors, often report an unstable sensor signal status due to rapid changes in the amount of NOx in the exhaust gas flow exceeding the capability of the sensor to react appropriately. Such rapid changes in the amount of NOx in the exhaust gas flow may occur as a result of transients, such as rapid changes in driver demanded torque. A rapid change in driver demanded torque is generally met by a sudden increase in fuel injection, boost pressure, and cylinder pressures and temperatures, which results in rapid changes in the NOx and oxygen content within the exhaust flow. However, the EONOx sensor or sensors may not be capable of processing the rapid changes properly, and report unstable readings as a result. This behavior may make it very difficult to have robust tailpipe NOx control and On Board Diagnostic (OBD) monitoring during such transients, particularly during rapid changes in driver demanded torque.

In order to compensate for unstable sensor signal status due to rapid changes in the amount of NOx in the exhaust gas flow, it is known to utilize a maturity debounce time in reacting to the sensor signal status. That is to say, when an EONOx sensor signal status changes from stable to unstable, and if the dew point is still set and there is no active sensor electrical fault, the system ignores the change for a fixed and/or arbitrary period of time in order to eliminate fluctuations in the EONOx sensor signal status. However, the use of an EONOx sensor signal status maturity debounce time to compensate for every unstable sensor signal may create a regulatory concern, particularly if the maturity debounce time is relatively long.

Accordingly, there is an unmet need for eliminating fluctuations in EONOx sensor signal status, and for providing a more appropriate response to rapid changes in the amount of NOx in the exhaust gas flow due to transients such as rapid changes in driver demanded torque.

SUMMARY

According to one embodiment of the System and Method for Estimating Engine Exhaust Nitrogen Oxide Sensor Instability, a vehicle has an engine. An exhaust system is connected to the engine and receives exhaust gasses from the engine. The exhaust system has an exhaust aftertreatment system. An EONOx sensor is connected to the exhaust system and provides a signal indicating NOx content in the exhaust gasses to one or more controllers. The one or more controllers are configured to predict instability in the EONOx sensor signal, validate the predicted instability in the EONOx sensor signal, and upon prediction and validation of instability in the EONOx sensor signal, latch the EONOx sensor signal to a stable value.

According to another embodiment of the System and Method for Estimating Engine Exhaust Nitrogen Oxide Sensor Instability, an EONOx sensor is connected to an exhaust aftertreatment system of a vehicle and provides a signal indicating NOx content in the exhaust gasses to one or more controllers. The one or more controllers are configured to predict instability in the EONOx sensor signal, validate the predicted instability in the EONOx sensor signal, and upon prediction and validation of instability in the EONOx sensor signal, latch the EONOx sensor signal to a stable value.

According to another embodiment of the System and Method for Estimating Engine Exhaust Nitrogen Oxide Sensor Instability, a method of estimating EONOx sensor signal instability in transient conditions and eliminating fluctuations in the EONOx sensor signal, includes several steps. The first step is predicting instability in the EONOx sensor signal using several sub-steps. The first sub-step is calculating a pedal based driver demand torque. The second sub-step is calculating a pedal based driver demand torque delta. The third sub-step is calculating instability thresholds for the calculated pedal based driver demand torque delta. The fourth sub-step is detecting instability in the calculated pedal based driver demand torque by comparing the calculated pedal based driver demand torque delta to the instability thresholds. The fifth sub-step is setting an instability flag predicting instability in the EONOx sensor signal when instability in the calculated pedal based driver demand torque is detected. The second step is validating the predicted instability in the EONOx sensor signal. The third step is, upon prediction and validation of instability in the EONOx sensor signal, latching the EONOx sensor signal to a stable value.

DESCRIPTION OF THE DRAWINGS

FIG. 3 is a graphical representation of a first sub-step taken in predicting EONOx sensor signal instability in an embodiment of a System and Method for Estimating Engine Exhaust Nitrogen Oxide Sensor Instability, as described herein;

FIG. 4 is a graphical representation of a second sub-step taken in predicting EONOx sensor signal instability in an embodiment of a System and Method for Estimating Engine Exhaust Nitrogen Oxide Sensor Instability, as described herein;

DETAILED DESCRIPTION

Figure 1:
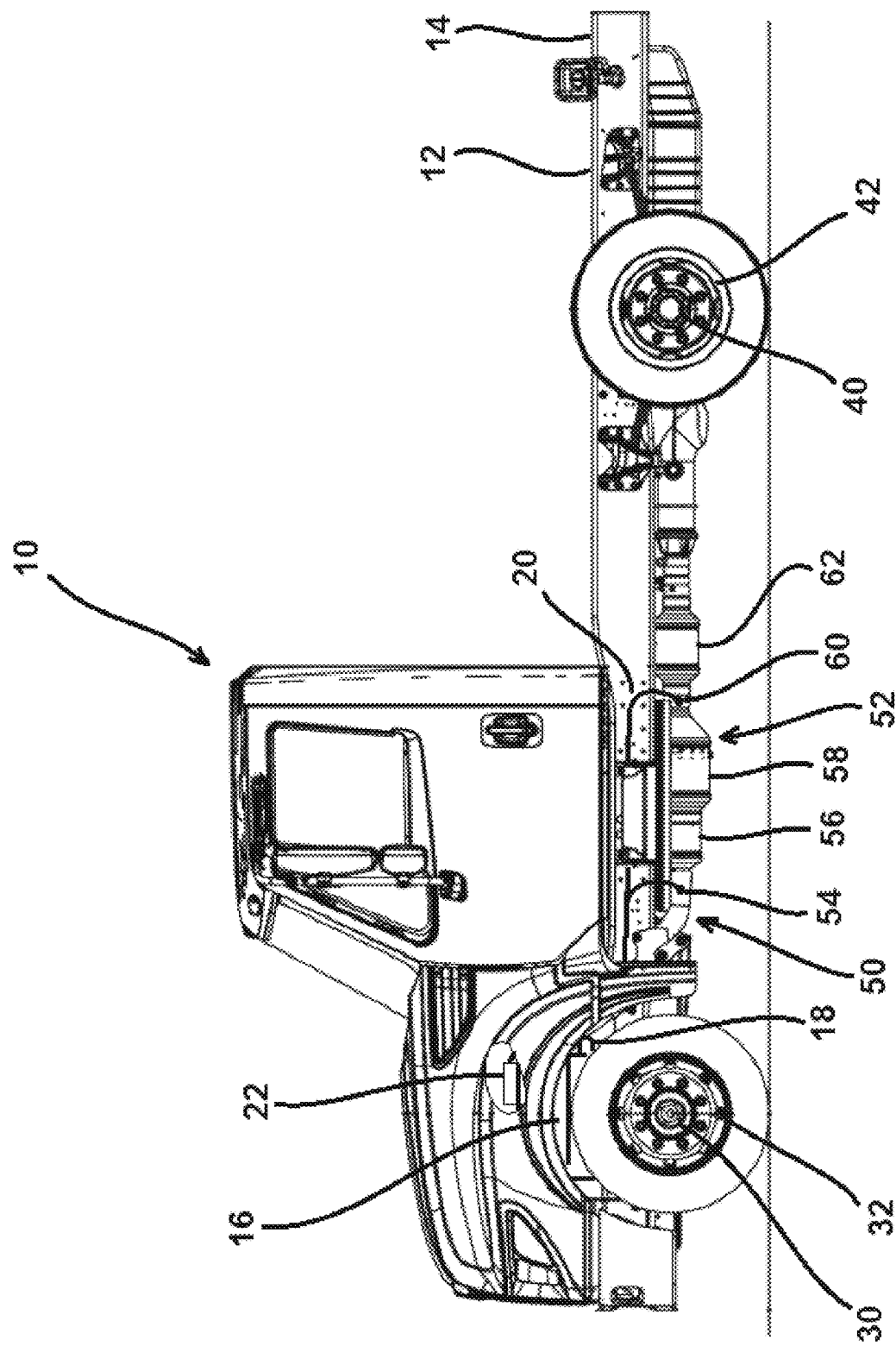
FIG. 1 is a side view of a vehicle having an embodiment of a System and Method for Estimating Engine Exhaust Nitrogen Oxide Sensor Instability, as described herein.

Embodiments described herein relate to a system and method for estimating EONOx sensor signal instability in transient conditions, for example when rapid changes occur in driver demanded torque, and for eliminating fluctuations in EONOx sensor signal status in order to have more robust on-board diagnostics monitoring and exhaust nitrogen oxide control. Having more robust exhaust nitrogen oxide control may include better control of such factors as boost pressure, fuel injection timing and profile, EGR valve setting, and SCR injection. The system and method may be applied to various types of vehicles, such as highway or semi-tractors, straight trucks, busses, fire trucks, agricultural vehicles, rail travelling vehicles, and etcetera. The several embodiments of the system and method presented herein are employed on vehicles having turbocharged diesel engines having both EGR and SCR, but this is not to be construed as limiting the scope of the system and method for estimating engine exhaust nitrogen oxide sensor signal instability in transient conditions and for eliminating fluctuations in EONOx sensor signal status, which may be applied to vehicles and engines of differing construction.

The system and method may be implemented within a vehicle Engine Control Module (ECM) connected to the EONOx sensor by way of a data bus, or may be implemented within a separate controller, such as a controller that is integrated with or specific to the EONOx sensor itself, as a non-limiting example. More specifically, embodiments of the system and method include several steps. The first step is verifying that the EONOx sensor dew point has been reached, and that there is no active system error in the ECM or other engine or exhaust controller or subsystem. The dew point is the exhaust temperature above which the EONOx sensor is operational and there is no moisture in the exhaust that would condense upon the EONOx sensor that would cause it to fail. A non-limiting exemplary dew point may be 150 degrees Celsius exhaust temperature. Verifying that there is no active system error in the ECM may be accomplished using an ECM diagnostics management system or subsystem, within the ECM or external to the ECM, using the same separate controller implementing the system and method for estimating EONOx sensor instability in transient conditions and for eliminating fluctuations in EONOx sensor signal status, or using another controller. The ECM diagnostics management system or subsystem may determine the presence of an active system error based on electrical faults or engine faults that can affect engine operation, and may identify such faults according to specific OEM criteria.

The second step is predicting EONOx sensor signal instability. This step is characterized by four sub-steps. The first sub-step in the EONOx sensor signal instability prediction routine calculates pedal based driver demand torque. This is accomplished by first comparing the accelerator pedal position, as provided by an accelerator pedal position sensor, and the present engine speed, as provided by an engine speed sensor, using a table based mapping or transfer function, and determining therefrom a calculated pedal torque request. The accelerator pedal position provided by the accelerator pedal position sensor may undergo signal processing prior to entry into the table based mapping or transfer function, so that the table based mapping or transfer function may compare a processed accelerator pedal position and the present engine speed. At the same time, the present transmission gear ratio, as provided by a transmission controller if an automatic or as calculated from engine speed and vehicle speed if a manual transmission, is multiplied with the vehicle specific rear axle ratio, which is an Original Equipment Manufacturer (OEM) predetermined value based on the vehicle rear axle specification, using a ratio multiplier to produce an overall drivetrain ratio. The calculated pedal torque request is then multiplied with the overall drivetrain ratio using a pedal torque request drivetrain ratio multiplier to produce a calculated pedal based driver demand torque.

The second sub-step in the EONOx sensor signal instability prediction routine calculates the instability in the calculated pedal based driver demand torque. This is accomplished by applying two different low pass filters to the calculated pedal based driver demand torque, a slow response factor low pass filter and a fast response factor low pass filter. The filter response factors for each of the slow response factor low pass filter and the fast response factor low pass filter may be calibratable, and may require multiple samples of driving behaviors, vehicle configurations, vehicle loads, and terrain in order to tune them. The output from the slow response factor low pass filter and the fast response factor low pass filter are compared in a difference calculation to produce a calculated pedal based driver demand torque delta. This provides a smoothing of the calculated pedal based driver demand torque delta.

The third sub-step in the EONOx sensor signal instability prediction routine calculates instability thresholds for the calculated pedal based driver demand torque delta. This is accomplished by entering the calculated pedal torque request and the overall drivetrain ratio determined in the first sub-step in the EONOx sensor signal instability prediction routine into a table based instability threshold mapping function. The table based instability threshold mapping function may also be calibratable, and may incorporate factors such as engine modelling, driver behavior, and/or pedal characteristics, as non-limiting examples. The table based instability threshold mapping function may also require multiple samples of driving behaviors, vehicle configurations, vehicle loads, and terrain, in order to calibrate it. Configuration of the table based instability threshold mapping function may require multiple samples taken from different vehicle configurations in order to tune it. The table based instability threshold mapping function then provides a low instability threshold and a high instability threshold, which together define a decision window.

The fourth sub-step in the EONOx sensor signal instability prediction routine detects instability in the calculated pedal based driver demand torque, using the calculated pedal based driver demand torque delta, as compared to the instability thresholds. Specifically, if the calculated pedal based driver demand torque delta is greater than the low instability threshold value but lesser than the high instability threshold value, then an instability flag is generated to indicate unstable pedal based driver demand torque behavior, unstable EONOx sensor signal output is predicted. If the calculated pedal based driver demand torque delta is lesser than the low instability threshold value or greater than the high instability threshold value, stable pedal based driver demand torque behavior likely leading to stable EONOx sensor signal output is predicted, and the instability flag is cleared.

Further, in at least one embodiment of the system and method, a high instability threshold hysteresis margin is provided above the high instability threshold, and a low instability threshold hysteresis margin is provided below the low instability threshold. If the calculated pedal based driver demand torque delta increases from below the low instability threshold to between the low instability threshold and the high instability threshold, the instability flag is set when the calculated pedal based driver demand torque delta crosses the low instability threshold value. If the calculated pedal based driver demand torque delta decreases from between the low instability threshold and the high instability threshold to below the low instability threshold, the instability flag is only cleared when the calculated pedal based driver demand torque delta crosses the low instability threshold hysteresis margin value. Similarly, if the calculated pedal based driver demand torque delta decreases from above the high instability threshold to between the low instability threshold and the high instability threshold, the instability flag is set when the calculated pedal based driver demand torque delta crosses the high instability threshold value. If the calculated pedal based driver demand torque delta increases from between the low instability threshold and the high instability threshold to above the high instability threshold, the instability flag is only cleared when the calculated pedal based driver demand torque delta crosses the high instability threshold hysteresis margin value.

Further permutations of the instability threshold margins are contemplated, such as placement of the low instability threshold hysteresis margin above the low instability threshold and/or placement of the high instability threshold hysteresis margin below the high instability threshold. In an embodiment wherein the low instability threshold hysteresis margin is placed above the low instability threshold, therefore, if the calculated pedal based driver demand torque delta increases from below the low instability threshold to between the low instability threshold and the high instability threshold, the instability flag is set when the calculated pedal based driver demand torque delta crosses the low instability threshold hysteresis margin value, and if the calculated pedal based driver demand torque delta decreases from between the low instability threshold and the high instability threshold to below the low instability threshold, the instability flag is only cleared when the calculated pedal based driver demand torque delta crosses the low instability threshold value. Similarly, in an embodiment wherein the high instability threshold hysteresis margin is placed below the high instability threshold, if the calculated pedal based driver demand torque delta decreases from above the high instability threshold to between the low instability threshold and the high instability threshold, the instability flag is set when the calculated pedal based driver demand torque delta crosses the high instability threshold hysteresis margin value, and if the calculated pedal based driver demand torque increases from between the low instability threshold and the high instability threshold to above the high instability threshold, the instability flag is only cleared when the calculated pedal based driver demand torque delta crosses the high instability threshold value.

The third step in the system and method is validation of any predicted EONOx sensor signal instability. This is accomplished by the system and method observing the EONOx sensor signal status for a very short time, for example 100 milliseconds, following a setting of the instability flag. In one embodiment of the system and method, a message persistent timer, which may for non-limiting example be set to five to ten seconds, may be used prior to the instability check in order to ensure that the EONOx sensor signal status is sufficiently mature. If the EONOx sensor signal status is found to be unstable during the very short observation period, the predicted EONOx sensor signal instability and setting of the instability flag is validated, and the system and method takes the fourth step of latching the EONOx sensor signal status to a stable value. Latching the EONOx sensor signal status to a stable value may mean that the EONOx sensor signal status is set to the most recent known value, generally the value just preceding the setting of the instability flag. Alternately, the EONOx sensor signal may be set to a fixed value, irrespective of the most recent known value. Still alternately, the EONOx sensor signal may be supplanted during the latched condition with a model based EONOx value. Only when the instability flag is cleared, the system and method takes the fifth step of releasing the EONOx sensor signal status from its latched state, and the process and method begins again.

In operation, therefore, only when the EONOx sensor dew point has been reached and there is no active system error in the ECM, and when EONOx sensor signal instability has been predicted, an instability flag set, and the EONOx sensor signal instability flag validated, possibly following a message persistent timer, by observation of the EONOx sensor signal status for the very short time, does the system and method latch the EONOx sensor signal status to a stable value. This may occur, for example in transient conditions such as following a rapid increase in driver demand torque. The EONOx sensor signal status remains latched to a stable value until the EONOx sensor signal instability flag is cleared. How long the EONOx sensor signal status remains latched, therefore, depends upon the driving profile, which may include such factors as driver driving behavior, vehicle configuration, vehicle load, and terrain. If no EONOx sensor signal instability has been predicted and the instability flag remains cleared, because the calculated pedal based driver demand torque remains stable, or if the predicted EONOx sensor signal instability does not pass validation because the EONOx sensor signal status is not found to be unstable during the very short observation period, then the EONOx sensor signal status remains unlatched.

The system and method for estimating EONOx sensor signal instability in transient conditions and for eliminating fluctuations in EONOx sensor signal status minimizes the impact of fluctuations in the EONOx sensor signal on vehicle emissions controls strategies and apparatuses downstream from the EONOx sensor. The system and method also minimizes EONOx sensor signal undesired behavior on critical On Board Diagnostics (OBD) monitors such as conversion efficiency and tailpipe NOx control. The system and method provides the opportunity for better control of such factors as boost pressure, fuel injection timing and profile, EGR valve setting, and SCR injection. The system and method further avoids potential regulatory concerns that may be generated by the use of arbitrary EONOx sensor signal status maturity debounce times. Additionally, the predictive nature of the system and method for estimating EONOx sensor signal instability in transient conditions and for eliminating fluctuations in EONOx sensor signal status provides an opportunity of taking preventative action, rather than action based on simple feedback based on the EONOx sensor signal alone.

Referring now to FIG. 1, a side view of a vehicle 10 having an embodiment of a system and method for estimating EONOx sensor signal instability in transient conditions and for eliminating fluctuations in EONOx sensor signal status is shown. The vehicle 10 includes a chassis 12 having a frame 14, to which is attached a front axle 30 having front wheels 32, and a rear axle 40 having rear wheels 42. An engine 16 provides power for propulsion by way of a transmission (not shown) and a driveshaft (not shown), which is connected to the rear drive axle 40. The engine 16 may also be provided with an Exhaust Gas Recirculation (EGR) system 18. The engine 16 may be controlled by an Engine Control Module (ECM) 22, which may also be connected to other vehicle subsystems by way of a data bus 20, which may be embodied as a J1939 data bus.

The vehicle 10 of FIG. 1 is further provided with an exhaust system 50 which is connected to and receives exhaust from the engine 16, and which is provided with an exhaust aftertreatment system 52, in order to remove certain unwanted particulates and nitrogen oxides from the exhaust gases. In a non-limiting exemplary arrangement, the exhaust aftertreatment system 52 may include a Diesel Oxidation Catalyst (DOC) 56, a Diesel Particulate Filter (DPF) 58, a Selective Catalytic Reductant (SCR) injector 60, and an SCR catalyst 62. In the embodiment shown in FIG. 1, an EONOx sensor 54 is situated at the upstream end of the exhaust aftertreatment system 52, and is connected to the ECM 22 by way of the data bus 20. In this way, the EONOx sensor 54 provides information concerning the nitrogen oxide content of the exhaust flow in the way of a sensor signal to the ECM 22 via the data bus 20. The ECM 22 uses the information concerning the nitrogen oxide content of the exhaust flow to control, for non-limiting example, operating parameters of the engine 16, the EGR system 18, and the SCR injector 60.

Figure 2:
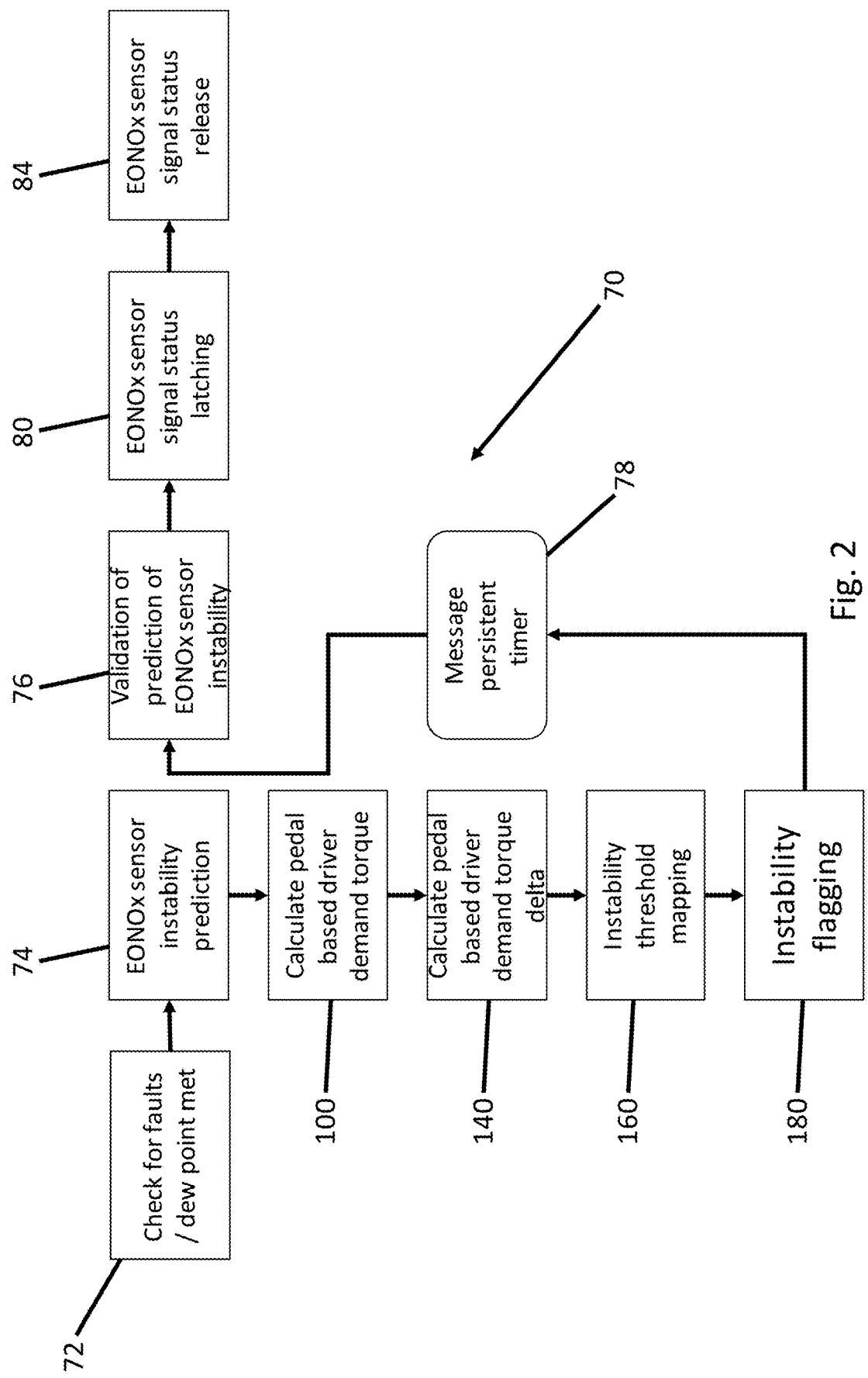
FIG. 2 is a graphical representation of an embodiment of a System and Method for Estimating Engine Exhaust Nitrogen Oxide Sensor Instability, as described herein.

Turning now to FIG. 2, the system and method 70 for estimating EONOx sensor signal instability in transient conditions and for eliminating fluctuations in EONOx sensor signal status is shown in further detail. In the illustrated embodiment, the system and method 70 may be implemented within the ECM 22 connected to the EONOx sensor 54 by way of the data bus 20 (not shown in FIG. 2), or may be implemented in a separate controller integrated with the EONOx sensor 54 or connected to the EONOx sensor 54 by way of the data bus 20, as noted previously. As shown in FIG. 2, the system and method 70 starts with a first step 72 that includes verifying that the EONOx sensor 54 dew point has been reached, and that there is no active system error in the ECM 22 or other engine or exhaust controller or subsystem. If the EONOx sensor 54 dew point has been reached, and if there is no active system error, the system and method 70 then takes a second step 74 which is an EONOx sensor signal instability prediction subroutine.

The EONOx sensor signal instability prediction subroutine of second step 74 includes a first sub-step 100 of calculating a pedal based driver demand torque, a second sub-step 140 of determining a calculated pedal based driver demand torque delta, a third sub-step 160 of calculating instability thresholds for the calculated pedal based driver demand torque delta, and a fourth sub-step 180 of detecting instability in the calculated pedal based driver demand torque, using the calculated pedal based driver demand torque delta, as compared to the instability thresholds and instability threshold hysteresis margins. Following the EONOx sensor signal instability prediction subroutine of second step 74, the system and method 70 may include an optional step 78 of running a message persistent timer, for non-limiting example of five to ten seconds, to ensure that the EONOx sensor 54 signal status is sufficiently mature. Alternately, the optional step 78 of running the message persistent timer may occur before the second step 74, or even during the second step 74, for non-limiting example prior to the fourth sub-step 180 of detecting instability in the calculated pedal based driver demand torque.

The system and method 70 then takes a third step 76 of validating any predicted EONOx sensor signal instability by observing the EONOx sensor signal status for a very short time, for example 100 milliseconds, following a setting of the instability flag, as noted previously. If the EONOx sensor 54 signal status is found to be unstable during the very short observation period of third step 76, the predicted EONOx sensor signal instability and setting of the instability flag according to second step 74 is validated, and the system and method 70 takes the fourth step 80 of latching the EONOx sensor 54 signal status to a stable value. Latching the EONOx sensor signal status to a stable value may mean that the EONOx sensor 54 signal status is set to the most recent known value, generally the value just preceding the setting of the instability flag. Alternately, the EONOx sensor 54 signal may be set to a fixed value, irrespective of the most recent known value. Still alternately, the EONOx sensor 54 signal may be supplanted during the latched condition with a model based EONOx value, as noted previously. Only when the instability flag is cleared, the system and method 70 takes the fifth step 84 of releasing the EONOx sensor 54 signal status from its latched state, and the process and method 70 begins again.

Turning now to FIGS. 3 through 6, further details are shown of the EONOx sensor signal instability prediction subroutine of second step 74 of the system and method 70. In FIG. 3, first sub-step 100 of calculating a pedal based driver demand torque 120 is accomplished by comparing the accelerator pedal position or processed accelerator pedal position 102, as provided by an, accelerator pedal position sensor (not shown) and in at least one embodiment having undergone signal processing, and the present engine speed 104, as provided by an engine speed sensor, using a table based mapping or transfer function 106, and determining therefrom a calculated pedal torque request 108. At the same time, the present transmission gear ratio 110 is multiplied with the vehicle specific rear axle ratio 112 using a ratio multiplier 114 to produce an overall drivetrain ratio 116. The calculated pedal torque request 108 is then multiplied with the overall drivetrain ratio 116 using a pedal torque request drivetrain ratio multiplier 118 to produce the calculated pedal based driver demand torque 120.

Figures 5, 6:
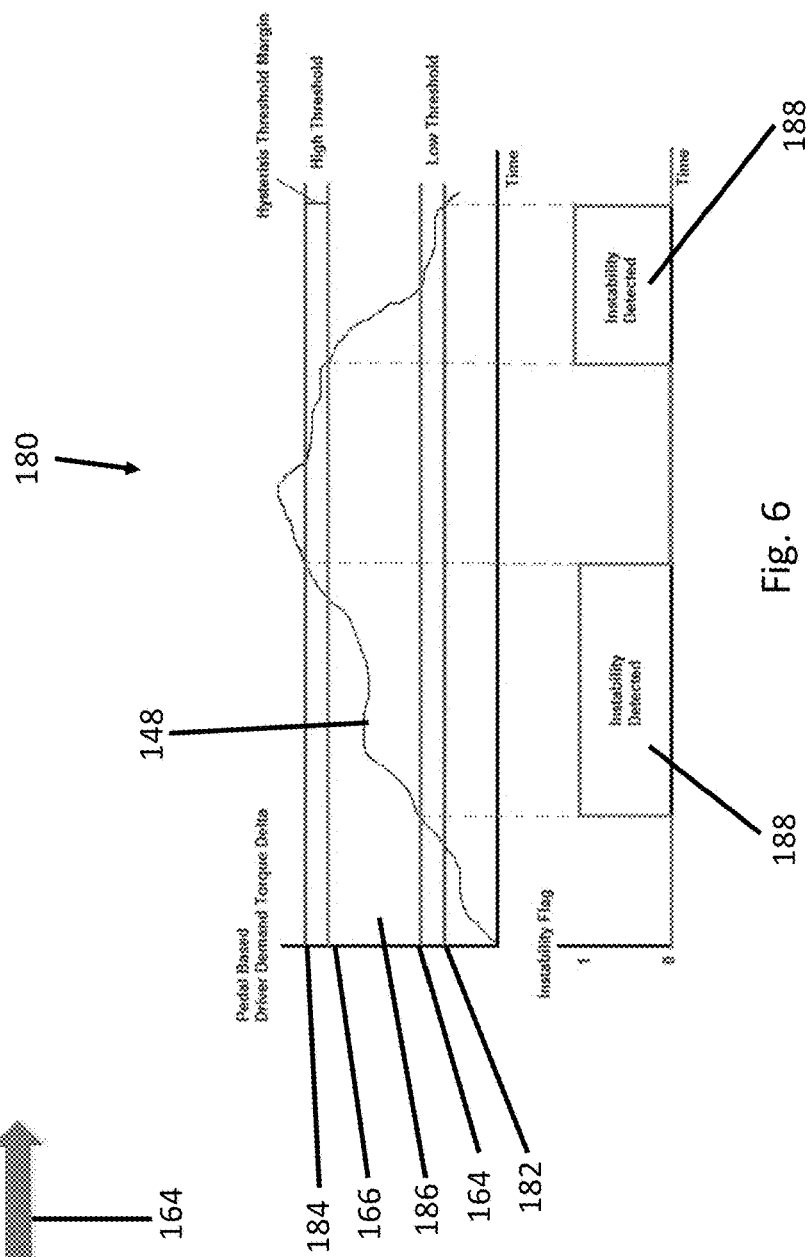
FIG. 5 is a graphical representation of a third sub-step taken in predicting EONOx sensor signal instability in an embodiment of a System and Method for Estimating Engine Exhaust Nitrogen Oxide Sensor Instability, as described herein.
FIG. 6 is a graphical representation of a fourth sub-step taken in predicting EONOx sensor signal instability in an embodiment of a System and Method for Estimating Engine Exhaust Nitrogen Oxide Sensor Instability, as described herein.

In FIG. 4, the second sub-step 140 of determining a calculated pedal based driver demand torque delta 148 is accomplished by applying a slow response factor low pass filter 142 and a fast response factor low pass filter 144 to the calculated pedal based driver demand torque 120. The output from the slow response factor low pass filter 142 and the output of the fast response factor low pass filter 144 are compared in a difference calculation 146 to produce the calculated pedal based driver demand torque delta 148. In FIG. 5, the third sub-step 160 of calculating instability thresholds for the calculated pedal based driver demand torque delta is accomplished by entering the calculated pedal torque request 108 and the overall drivetrain ratio 116 determined in the first sub-step 100 into a table based instability threshold mapping function 162. The table based instability threshold mapping function 162 may be calibratable, and may incorporate factors such as engine modelling, driver behavior, and/or pedal characteristics, as noted previously. The table based instability threshold mapping function 162 then outputs a low instability threshold 164 and a high instability threshold 166.

In FIG. 6, the fourth sub-step 180 of detecting instability in the calculated pedal based driver demand torque 120 using the calculated pedal based driver demand torque delta 148 is shown. The low instability threshold 164 and the high instability threshold 166 generated in the third sub-step 160 together define a decision window 186. If the calculated pedal based driver demand torque delta 148 is greater than the low instability threshold 164 but lesser than the high instability threshold 166, then an instability flag 188 is generated to indicate unstable pedal based driver demand torque behavior, thereby predicting unstable EONOx sensor 54 signal output. If the calculated pedal based driver demand torque delta is lesser than the low instability threshold 164 or greater than the high instability threshold 166, stable pedal based driver demand torque behavior likely leading to stable EONOx sensor 54 signal output is predicted, and the instability flag 188 is cleared.

In the embodiment of the system and method 70 shown in FIG. 6, a high instability threshold hysteresis margin 184 is provided above the high instability threshold 166, and a low instability threshold hysteresis margin 182 is provided below the low instability threshold 164. As described previously, if the calculated pedal based driver demand torque delta 148 increases from below the low instability threshold 164 to the decision window 186 between the low instability threshold 164 and the high instability threshold 166, the instability flag 188 is set when the calculated pedal based driver demand torque delta 148 crosses the low instability threshold value 164. If the calculated pedal based driver demand torque delta 148 decreases from the decision window 186 between the low instability threshold 164 and the high instability threshold 166 to below the low instability threshold 164, the instability flag 188 is only cleared when the calculated pedal based driver demand torque delta 148 crosses the low instability threshold hysteresis margin 182. Again, if the calculated pedal based driver demand torque delta 148 decreases from above the high instability threshold 166 to the decision window 186 between the low instability threshold 164 and the high instability threshold 166, the instability flag 188 is set when the calculated pedal based driver demand torque delta 148 crosses the high instability threshold value 166. If the calculated pedal based driver demand torque delta 148 increases from the decision window 186 between the low instability threshold 164 and the high instability threshold 166 to above the high instability threshold 166, the instability flag 188 is only cleared when the calculated pedal based driver demand torque delta 148 crosses the high instability threshold hysteresis margin 184. As noted previously, further permutations of the instability threshold hysteresis margins 182 and 184 are contemplated, such as placement of the low instability threshold hysteresis margin 182 above the low instability threshold 164 and/or placement of the high instability threshold hysteresis margin 184 below the high instability threshold 166.

While the system and method for estimating engine exhaust nitrogen oxide sensor signal instability in transient conditions, for example when rapid changes occur in driver demanded torque, and for eliminating fluctuations in EONOx sensor signal status in order to have more robust on-board diagnostics monitoring and exhaust nitrogen oxide control has been described with respect to at least one embodiment, the system and method can be further modified within the spirit and scope of this disclosure, as demonstrated previously. This application is therefore intended to cover any variations, uses, or adaptations of the system and method using its general principles. Further, this application is intended to cover such departures from the present disclosure as come within known or customary practice in the art to which the disclosure pertains and which fall within the limits of the appended claims.

What is claimed is:

1. A vehicle, comprising:
    an engine;
    an exhaust system connected to the engine and receiving exhaust gasses therefrom, the exhaust system having an exhaust aftertreatment system;
    an Engine Out Nitrogen Oxide (EONOx) sensor connected to the exhaust system and providing a signal indicating Nitrogen Oxide (NOx) content in the exhaust gasses to at least one controller, the at least one controller being configured to:
        predict instability in the EONOx sensor signal,
        validate the predicted instability in the EONOx sensor signal, and
        upon prediction and validation of instability in the EONOx sensor signal, latch the EONOx sensor signal to a stable value; and
    the at least one controller being further configured to predict instability in the EONOx sensor signal by:
        calculating a pedal based driver demand torque,
        calculating a pedal based driver demand torque delta,
        calculating instability thresholds for the calculated pedal based driver demand torque delta, detecting instability in the calculated pedal based driver demand torque by comparing the calculated pedal based driver demand torque delta to the instability thresholds, and setting an instability flag predicting instability in the EONOx sensor signal when instability in the calculated pedal based driver demand torque is detected.

2. The vehicle of claim 1, wherein:
the at least one controller being further configured to calculate the pedal based driver demand torque by:
comparing an accelerator pedal position and a present engine speed using a table based mapping or transfer function, and determining from the table based mapping or transfer function a calculated pedal torque request,
multiplying a present transmission gear ratio with a vehicle specific rear axle ratio using a ratio multiplier to produce an overall drivetrain ratio, and
multiplying the calculated pedal torque request with the overall drivetrain ratio using a pedal torque request drivetrain ratio multiplier to produce the calculated pedal based driver demand torque.

3. The vehicle of claim 2, wherein:
the at least one controller being further configured to calculate the pedal based driver demand torque delta by:
applying a slow response factor low pass filter to the calculated pedal based driver demand torque,
applying a fast response factor low pass filter to the calculated pedal based driver demand torque, and
comparing an output from the slow response factor low pass filter and an output from the fast response factor low pass filter in a difference calculation to produce the calculated pedal based driver demand torque delta.

4. The vehicle of claim 3, wherein:
the at least one controller being further configured to calculate instability thresholds for the calculated pedal based driver demand torque delta by:
entering the calculated pedal torque request and the overall drivetrain ratio into a table based instability threshold mapping function, and
using the table based instability threshold mapping function to provide a low instability threshold and a high instability threshold, together defining a decision window.

5. The vehicle of claim 4, wherein:
the at least one controller being further configured to detect instability in the calculated pedal based driver demand torque by:
setting the instability flag if the calculated pedal based driver demand torque delta is greater than the low instability threshold value but lesser than the high instability threshold value, and
clearing the instability flag if the calculated pedal based driver demand torque delta is lesser than the low instability threshold value or greater than the high instability threshold value.

6. The vehicle of claim 5, wherein:
the at least one controller being further configured to generate a high instability threshold hysteresis margin above the high instability threshold, and a low instability threshold hysteresis margin below the low instability threshold, and to:
set the instability flag when the calculated pedal based driver demand torque delta crosses the low instability threshold value if the calculated pedal based driver demand torque delta increases from below the low instability threshold to between the low instability threshold and the high instability threshold, or when the calculated pedal based driver demand torque delta crosses the high instability threshold value if the calculated pedal based driver demand torque delta decreases from above the high instability threshold to between the low instability threshold and the high instability threshold, and clear the instability flag when calculated pedal based driver demand torque delta crosses the low instability threshold hysteresis margin value if the calculated pedal based driver demand torque delta decreases from between the low instability threshold and the high instability threshold to below the low instability threshold, or when the calculated pedal based driver demand torque delta crosses the high instability threshold hysteresis margin value if the calculated pedal based driver demand torque delta increases from between the low instability threshold and the high instability threshold to above the high instability threshold.

7. The vehicle of claim 1, wherein:
the at least one controller being further configured to validate the predicted EONOx sensor signal instability by observing the EONOx sensor signal for an observation period following a setting of the instability flag.

8. An exhaust aftertreatment system of a vehicle, comprising:
an Engine Out Nitrogen Oxide (EONOx) sensor connected to the exhaust aftertreatment system and providing a signal indicating Nitrogen Oxide (NOx) content in the exhaust gasses to at least one controller, the at least one controller being configured to:
predict instability in the EONOx sensor signal,
validate the predicted instability in the EONOx sensor signal, and
upon prediction and validation of instability in the EONOx sensor signal, latch the EONOx sensor signal to a stable value; and
the at least one controller being further configured to predict instability in the EONOx sensor signal by:
calculating a pedal based driver demand torque,
calculating a pedal based driver demand torque delta,
calculating instability thresholds for the calculated pedal based driver demand torque delta,
detecting instability in the calculated pedal based driver demand torque by comparing the calculated pedal based driver demand torque delta to the instability thresholds, and
setting an instability flag predicting instability in the EONOx sensor signal when instability in the calculated pedal based driver demand torque is detected.

9. The exhaust aftertreatment system of a vehicle of claim 8, wherein:
the at least one controller being further configured to calculate the pedal based driver demand torque by:
comparing an accelerator pedal position and a present engine speed using a table based mapping or transfer function, and determining from the table based mapping or transfer function a calculated pedal torque request,
multiplying a present transmission gear ratio with a vehicle specific rear axle ratio using a ratio multiplier to produce an overall drivetrain ratio, and
multiplying the calculated pedal torque request with the overall drivetrain ratio using a pedal torque request drivetrain ratio multiplier to produce the calculated pedal based driver demand torque.

10. The exhaust aftertreatment system of a vehicle of claim 9, wherein:
the at least one controller being further configured to calculate the pedal based driver demand torque delta by:
applying a slow response factor low pass filter to the calculated pedal based driver demand torque,
applying a fast response factor low pass filter to the calculated pedal based driver demand torque, and
comparing an output from the slow response factor low pass filter and an output from the fast response factor low pass filter in a difference calculation to produce the calculated pedal based driver demand torque delta.

11. The exhaust aftertreatment system of a vehicle of claim 10, wherein:
the at least one controller being further configured to calculate instability thresholds for the calculated pedal based driver demand torque delta by:
entering the calculated pedal torque request and the overall drivetrain ratio into a table based instability threshold mapping function, and
using the table based instability threshold mapping function to provide a low instability threshold and a high instability threshold, together defining a decision window.

12. The exhaust aftertreatment system of a vehicle of claim 11, wherein:
the at least one controller being further configured to detect instability in the calculated pedal based driver demand torque by:
setting the instability flag if the calculated pedal based driver demand torque delta is greater than the low instability threshold value but lesser than the high instability threshold value, and
clearing the instability flag if the calculated pedal based driver demand torque delta is lesser than the low instability threshold value or greater than the high instability threshold value.

13. The exhaust aftertreatment system of a vehicle of claim 12, wherein:
the at least one controller being further configured to generate a high instability threshold hysteresis margin above the high instability threshold, and a low instability threshold hysteresis margin below the low instability threshold, and to:
set the instability flag when the calculated pedal based driver demand torque delta crosses the low instability threshold value if the calculated pedal based driver demand torque delta increases from below the low instability threshold to between the low instability threshold and the high instability threshold, or when the calculated pedal based driver demand torque delta crosses the high instability threshold value if the calculated pedal based driver demand torque delta decreases from above the high instability threshold to between the low instability threshold and the high instability threshold, and
clear the instability flag when calculated pedal based driver demand torque delta crosses the low instability threshold hysteresis margin value if the calculated pedal based driver demand torque delta decreases from between the low instability threshold and the high instability threshold to below the low instability threshold, or when the calculated pedal based driver demand torque delta crosses the high instability threshold hysteresis margin value if the calculated pedal based driver demand torque delta increases from between the low instability threshold and the high instability threshold to above the high instability threshold.

14. A method of estimating EONOx sensor signal instability in transient conditions and eliminating fluctuations in the EONOx sensor signal, comprising the steps of:
predicting instability in the EONOx sensor signal by:
calculating a pedal based driver demand torque,
calculating a pedal based driver demand torque delta,
calculating instability thresholds for the calculated pedal based driver demand torque delta,
detecting instability in the calculated pedal based driver demand torque by comparing the calculated pedal based driver demand torque delta to the instability thresholds, and
setting an instability flag predicting instability in the EONOx sensor signal when instability in the calculated pedal based driver demand torque is detected;
validating the predicted instability in the EONOx sensor signal, and
upon prediction and validation of instability in the EONOx sensor signal, latching the EONOx sensor signal to a stable value.

15. The method of claim 14, further comprising the steps of:
calculating the pedal based driver demand torque by:
comparing an accelerator pedal position and a present engine speed using a table based mapping or transfer function, and determining from the table based mapping or transfer function a calculated pedal torque request,
multiplying a present transmission gear ratio with a vehicle specific rear axle ratio using a ratio multiplier to produce an overall drivetrain ratio, and
multiplying the calculated pedal torque request with the overall drivetrain ratio using a pedal torque request drivetrain ratio multiplier to produce the calculated pedal based driver demand torque,
calculating the pedal based driver demand torque delta by:
applying a slow response factor low pass filter to the calculated pedal based driver demand torque,
applying a fast response factor low pass filter to the calculated pedal based driver demand torque, and
comparing an output from the slow response factor low pass filter and an output from the fast response factor low pass filter in a difference calculation to produce the calculated pedal based driver demand torque delta,
calculating instability thresholds for the calculated pedal based driver demand torque delta by:
entering the calculated pedal torque request and the overall drivetrain ratio into a table based instability threshold mapping function, and
using the table based instability threshold mapping function to provide a low instability threshold and a high instability threshold, together defining a decision window.

16. The method of claim 15, further comprising the steps of:
detecting instability in the calculated pedal based driver demand torque by:
setting the instability flag if the calculated pedal based driver demand torque delta is greater than the low instability threshold value but lesser than the high instability threshold value, and clearing the instability flag if the calculated pedal based driver demand torque delta is lesser than the low instability threshold value or greater than the high instability threshold value.

17. The method of claim 16, further comprising the steps of:

validating the predicted EONOx sensor signal instability by observing the EONOx sensor signal for an observation period following a setting of the instability flag.

* * * * *